(12) United States Patent
Tsutsumi et al.

(10) Patent No.: US 10,135,040 B2
(45) Date of Patent: Nov. 20, 2018

(54) ELECTRIC STORAGE DEVICE, ELECTRIC STORAGE DEVICE ASSEMBLY, AND METHOD FOR PRODUCING ELECTRIC STORAGE DEVICE

(71) Applicant: GS Yuasa International Ltd., Kyoto-shi (JP)

(72) Inventors: Masakazu Tsutsumi, Kyoto (JP); Takuma Tonari, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 486 days.

(21) Appl. No.: 14/649,194

(22) PCT Filed: Dec. 19, 2013

(86) PCT No.: PCT/JP2013/084086
§ 371 (c)(1),
(2) Date: Jun. 2, 2015

(87) PCT Pub. No.: WO2014/103874
PCT Pub. Date: Jul. 3, 2014

(65) Prior Publication Data
US 2015/0318519 A1     Nov. 5, 2015

(30) Foreign Application Priority Data
Dec. 25, 2012    (JP) ................................ 2012-281459

(51) Int. Cl.
*H01M 2/06*     (2006.01)
*H01M 2/20*     (2006.01)
(Continued)

(52) U.S. Cl.
CPC ............. *H01M 2/06* (2013.01); *B23K 20/002* (2013.01); *B23K 20/122* (2013.01); *H01G 4/228* (2013.01);
(Continued)

(58) Field of Classification Search
None
See application file for complete search history.

(56) References Cited

U.S. PATENT DOCUMENTS 8,586,230 B2    11/2013    Kim et al.
2011/0081568 A1    4/2011    Kim et al.
(Continued)

FOREIGN PATENT DOCUMENTS

JP     2009-208138 A     9/2009
JP     2010-097764 A     4/2010
(Continued)

OTHER PUBLICATIONS

English Translation of the International Preliminary Report on Patentability (Chapter I) in PCT Application No. PCT/JP2013/084086 dated Jul. 9, 2015.
(Continued)

*Primary Examiner* — Daniel S Gatewood
(74) *Attorney, Agent, or Firm* — McGinn IP Law Group, PLLC

(57) ABSTRACT

Provided is an electric storage device including a first conductive member having a head bulging from an inserted part inserted through a partition wall, and a second conductive member that is formed using a metal material different from a material of the first conductive member and is fixed to the head of the first conductive member by friction stir welding.

18 Claims, 16 Drawing Sheets

(51) Int. Cl.
   *H01G 4/228* (2006.01)
   *H01G 9/008* (2006.01)
   *H01M 10/0525* (2010.01)
   *H01M 2/30* (2006.01)
   *B23K 20/12* (2006.01)
   *H01G 9/15* (2006.01)
   *H01G 9/048* (2006.01)
   *B23K 20/00* (2006.01)

(52) U.S. Cl.
   CPC ............ *H01G 9/008* (2013.01); *H01G 9/048* (2013.01); *H01G 9/15* (2013.01); *H01M 2/202* (2013.01); *H01M 2/204* (2013.01); *H01M 2/206* (2013.01); *H01M 2/30* (2013.01); *H01M 10/0525* (2013.01); *H01M 2220/20* (2013.01); *H01M 2220/30* (2013.01); *Y02E 60/13* (2013.01)

(56) References Cited

U.S. PATENT DOCUMENTS

| | | |
|---|---|---|
| 2011/0081569 A1 | 4/2011 | Kim et al. |
| 2011/0159353 A1 | 6/2011 | Byun et al. |
| 2011/0195296 A1* | 8/2011 | Kim ............... B23K 26/32 429/151 |
| 2011/0244308 A1 | 10/2011 | Byun et al. |
| 2011/0244309 A1 | 10/2011 | Byun et al. |
| 2011/0256445 A1 | 10/2011 | Kim et al. |
| 2012/0177978 A1 | 7/2012 | Kim et al. |
| 2012/0264007 A1* | 10/2012 | Sasaki ............ H01M 2/043 429/182 |
| 2012/0264008 A1 | 10/2012 | Okamoto et al. |
| 2012/0282502 A1 | 11/2012 | Kim |
| 2013/0302660 A1 | 11/2013 | Shiraishi et al. |
| 2013/0309559 A1 | 11/2013 | Shiraishi et al. |

FOREIGN PATENT DOCUMENTS

| | | |
|---|---|---|
| JP | 2010-097822 A | 4/2010 |
| JP | 2010-137269 A | 6/2010 |
| JP | 2011-082159 A | 4/2011 |
| JP | 2011-082164 A | 4/2011 |
| JP | 2011-138765 A | 7/2011 |
| JP | 2011-210720 A | 10/2011 |
| JP | 2011-210725 A | 10/2011 |
| JP | 2011-228302 A | 11/2011 |
| JP | 2012-146664 A | 8/2012 |
| JP | 2012-234813 A | 11/2012 |
| JP | 2012-248451 A | 12/2012 |
| KR | 2011-0092042 A | 8/2011 |
| WO | WO 2012-098843 A | 7/2012 |
| WO | WO 2012-105491 A | 8/2012 |

OTHER PUBLICATIONS

International Search Report (ISR) (PCT Form PCT/ISA/210), in PCT/JP2013/084086, dated Jan. 28, 2014.

Japanese Office Action dated Aug. 25, 2017, with an English translation.

* cited by examiner

ELECTRIC STORAGE DEVICE, ELECTRIC STORAGE DEVICE ASSEMBLY, AND METHOD FOR PRODUCING ELECTRIC STORAGE DEVICE

CROSS-REFERENCE TO RELATED APPLICATION

This application claims priority to Japanese Patent Application No. 2012-281459, the disclosure of which is incorporated herein by reference in its entirety.

FIELD

The present invention relates to an electric storage device including an electrode assembly, a case housing the electrode assembly, and a conductive member passing through a partition wall of the case, to an electric storage device assembly, and to a method for producing an electric storage device.

BACKGROUND

In recent years, rechargeable electric storage devices such as battery cells (such as lithium ion battery cells and nickel hydrogen battery cells) and capacitors (such as electric double layer capacitors) have been employed as power sources, for example, for vehicles (such as automobiles and motorcycles) and various equipment (such as mobile terminals and laptop computers). For example, a battery cell includes an electrode assembly and a case. The case includes a case body housing the electrode assembly and a cover plate configured to close an opening of the case body. A current collector is connected to the electrode assembly. The electrode assembly and the current collector are arranged inside the case. An external terminal is, for example, arranged on the outer surface of the cover plate. The external terminal and the current collector are connected directly or indirectly to each other. Thus, the external terminal and the electrode assembly are electrically connected to each other.

As a method for electrically connecting the external terminal and the current collector to each other, a conductive member is used. The conductive member includes a first conductive member and a second conductive member. The first conductive member includes a body part, a first swaged part projecting from the lower surface of the body part and a second swaged part projecting from the upper surface of the body part. The second conductive member has two through holes. The second swaged part of the first conductive member and a shaft of the external terminal are respectively inserted through the two through holes.

In a battery cell disclosed in Patent Literature 1, a first conductive member (auxiliary terminal 8) includes a body part (base part 8a), a first swaged part (first swaged tube 8b), and a second swaged part (second swaged tube 8c). An external terminal (external terminal 4) includes a head (base part 4a) and an externally threaded part (bolt part 4b). A second conductive member (connection conductor 9) includes two through holes (a swaging hole 9a and a terminal through-hole 9b). The first conductive member is arranged on the outer surface of a cover plate (cover plate 3) via a sealing member (external insulation sealing member 6). The first swaged part of the first conductive member is inserted through a through hole of a current collector (current collecting connector 5) inside the case. The tip portion of the first swaged part projecting downwardly through the through hole is swaged from below. Further, the external terminal is arranged on the outer surface of the cover plate via a terminal detent member that is provided in the sealing member or separately from the sealing member. The second swaged part of the second conductive member and the externally threaded part of the external terminal are respectively inserted through the two through holes of the second conductive member. The tip portion of the second swaged part projecting upwardly from one of the through holes (the swaging hole 9a) is swaged from above. This allows the external terminal and the current collector to be electrically connected to each other via the first conductive member and the second conductive member.

In the battery cell disclosed in Patent Literature 1, the second swaged part of the first conductive member is swaged to the second conductive member. Therefore, the second conductive member is connected to the first conductive member. The second swaged part prevents space saving on the upper surface of the second conductive member.

Therefore, the second conductive member is welded to the first conductive member, thereby omitting the second swaged part from the first conductive member. It is conceivable that space saving on the upper surface of the second conductive member is thus achieved. However, there are cases where the first conductive member and the second conductive member are produced using different metals. In such a case, the first conductive member and the second conductive member are connected to each other by welding the different kinds of metals. Generally, welding of different kinds of metals is not preferable because a welding failure tends to occur.

Welding the first conductive member and the second conductive member for space saving on the upper surface of the second conductive member is also required in the same manner as in battery cells of a welding type in which a bus bar is welded to a second conductive member serving as an external terminal.

Further, this type of problem is not limited to battery cells. This type of problem also applies to capacitors (such as electric double layer capacitors) as well.

CITATION LIST

Patent Literature

Patent Literature 1: JP 2010-097764 A

SUMMARY

Technical Problem

The present invention has been devised in view of the problems described above, and an object thereof is to provide an electric storage device, an electric storage device assembly, and a method for producing an electric storage device, in which a first conductive member and a second conductive member are well joined, even if the first conductive member and the second conductive member are different kinds of metals.

Solution to Problem

An electric storage device according to the present invention includes: an electrode assembly including a positive electrode plate and a negative electrode plate insulated from each other; a case comprising a partition wall and housing the electrode assembly; a first conductive member passing through the partition wall and electrically connected to the electrode assembly inside the case; and a second conductive member arranged outside the case and electrically connected to the first conductive member, wherein the first conductive member includes an inserted part inserted through the partition wall and a head bulging from the inserted part, and the second conductive member is formed using a metal material different from a material of the first conductive member and is fixed to the head of the first conductive member by friction stir welding.

According to an aspect of the present invention, the electric storage device may be configured so that the head of the first conductive member and the second conductive member respectively have flat surfaces, and the flat surfaces are joined to each other by friction stir welding.

Further, according to another aspect of the present invention, the electric storage device may be configured so that the second conductive member has a recess configured to house at least a part of the head of the first conductive member.

In this case, the recess may form a non-circular opening.

Furthermore, in this case, abutting surfaces of at least a part of the head of the first conductive member and the recess of the second conductive member may be joined to each other by friction stir welding.

Further, according to another aspect of the present invention, the electric storage device may be configured so that one of the head of the first conductive member and the second conductive member has a projection, the other of the head of the first conductive member and the second conductive member has a hole into which the projection is inserted or fitted, and abutting surfaces of the projection and the hole are joined to each other by friction stir welding.

In this case, the configuration may be such that the projection non-circularly projects, and the hole forms a non-circular opening.

Further, according to still another aspect of the present invention, the electric storage device may be configured so that the recess is formed through the second conductive member, and an upper surface of the head of the first conductive member and an upper surface of the second conductive member are flush with each other.

Further, according to another aspect of the present invention, the electric storage device may be configured so that the projection is formed on the head of the first conductive member, the hole is formed through the second conductive member, and an upper surface of the projection of the first conductive member and an upper surface of the second conductive member are flush with each other.

An electric storage device according to the present invention includes: an electrode assembly including a positive electrode plate and a negative electrode plate insulated from each other; a case constituted by a partition wall and housing the electrode assembly; a first conductive member passing through the partition wall and electrically connected to the electrode assembly inside the case; and a second conductive member arranged outside the case and electrically connected to the first conductive member, wherein the first conductive member includes an inserted part inserted through the partition wall and a head bulging from the inserted part, the first conductive member is formed using a first metal material, the second conductive member is formed using a second metal material that is different from the first conductive member, and the second conductive member is fixed to the head of the first conductive member via a nugget part in which the first metal material and the second metal material are mixed.

An electric storage device assembly according to the present invention includes at least two electric storage devices including at least one electric storage device as described above; and a coupling member configured to couple the electric storage devices to each other.

A method for producing an electric storage device according to the present invention includes: fixing the second conductive member to the head of the first conductive member by friction stir welding; and fixing the first conductive member to which the second conductive member has been fixed to the partition wall of the case by inserting the first conductive member therethrough.

Advantageous Effects of Invention

As described above, according to the present invention, the first conductive member and the second conductive member are well joined, even if the first conductive member and the second conductive member are different kinds of metals.

DESCRIPTION OF EMBODIMENTS

Figure 1:
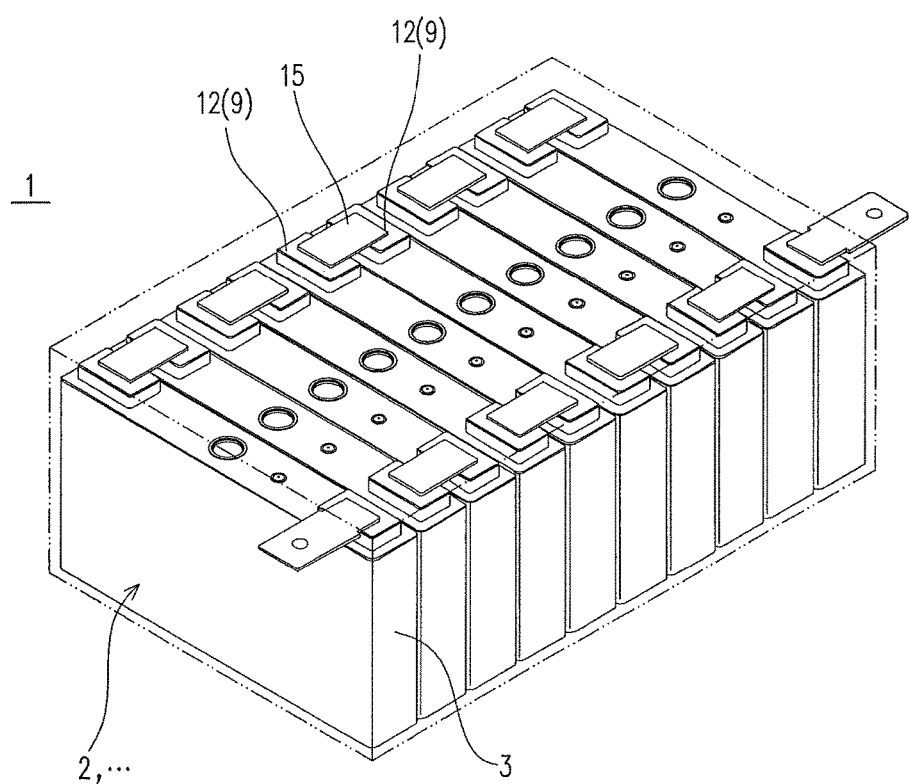
FIG. 1 is a perspective view showing assembled battery according to an embodiment of the present invention.
Figure 2:
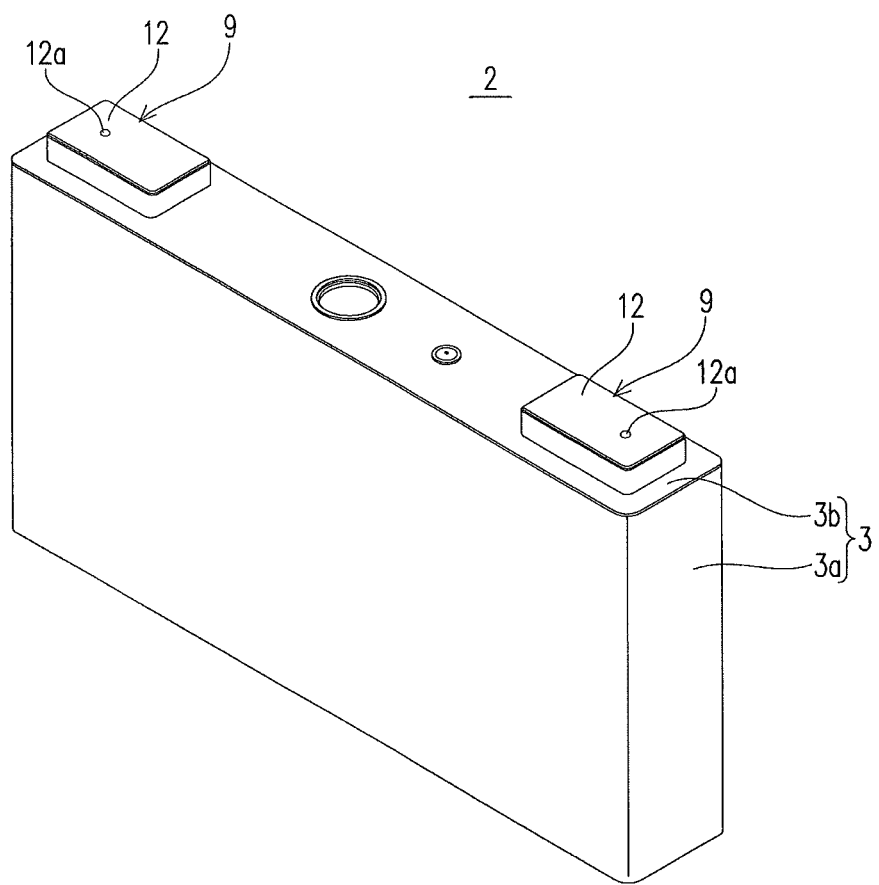
FIG. 2 is a perspective view showing a single battery cell according to the aforementioned embodiment.
Figure 3:
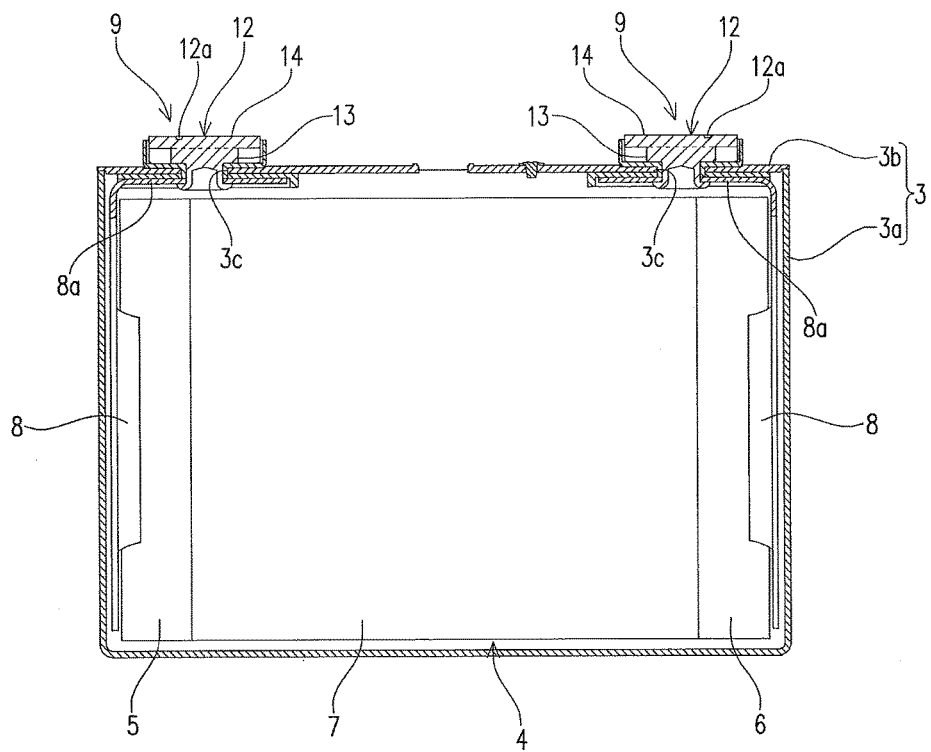
FIG. 3 is a longitudinal sectional view showing the battery cell.
Figure 4:
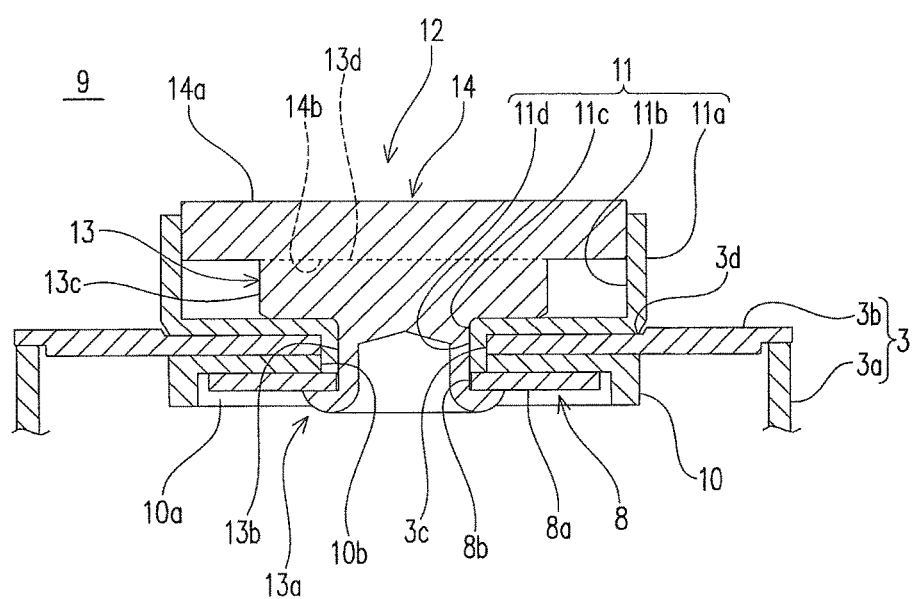
FIG. 4 is an enlarged lateral sectional view showing a terminal structure of the battery cell before friction stir welding.

An electric storage device according to the present invention includes: an electrode assembly including a positive electrode plate and a negative electrode plate insulated from each other; a case constituted by a partition wall and housing the electrode assembly; a first conductive member passing through the partition wall and electrically connected to the electrode assembly inside the case; and a second conductive member arranged outside the case and electrically connected to the first conductive member, wherein the first conductive member includes an inserted part inserted through the partition wall and a head bulging from the inserted part, and the second conductive member is formed using a metal material different from a material of the first conductive member and is fixed to the head of the first conductive member by friction stir welding.

According to such a configuration, the second conductive member is fixed to the head bulging from the inserted part of the first conductive member so that a large contact area is ensured between the second conductive member and the first conductive member. The first conductive member and the second conductive member are connected by joining different kinds of metals to each other. Since the contact resistance between the first conductive member and the second conductive member is low, the second conductive member is better joined to the first conductive member by friction stir welding.

According to an aspect of the present invention, the electric storage device may be configured so that the head of the first conductive member and the second conductive member respectively have flat surfaces, and the flat surfaces are joined to each other by friction stir welding.

According to such a configuration, the flat surface of the head of the first conductive member and the flat surface of the second conductive member are joined together. The contact resistance between the flat surfaces can be reduced to a low level.

Further, according to another aspect of the present invention, the electric storage device may be configured so that the second conductive member has a recess configured to house at least a part of the head of the first conductive member.

According to such a configuration, the recess of the second conductive member is used when the second conductive member and the first conductive member are joined together by friction stir welding for positioning the second conductive member with respect to the head of the first conductive member.

In this case, the recess may form a non-circular opening.

According to such a configuration, the head of the first conductive member is housed in the recess, thereby allowing the second conductive member to be joined by friction stir welding while it is prevented from rotating with respect to the head of the first conductive member.

Furthermore, in this case, abutting surfaces of at least a part of the head of the first conductive member and the recess of the second conductive member may be joined to each other by friction stir welding.

According to such a configuration, the head of the first conductive member and the second conductive member are joined together by joining the abutting surfaces to each other by friction stir welding along the abutting surfaces. Therefore, energy necessary for friction stir welding is reduced to a low level. The abutting surfaces herein mean the outer surface of the head of the first conductive member and the inner surface of the recess of the second conductive member that face each other in a direction intersecting the penetration direction (direction in which the head is inserted or fitted into the recess) of the head toward the recess.

Further, according to another aspect of the present invention, the electric storage device may be configured so that one of the head of the first conductive member and the second conductive member has a projection, the other of the head of the first conductive member and the second conductive member has a hole into which the projection is inserted or fitted, and abutting surfaces of the projection and the hole are joined to each other by friction stir welding.

According to such a configuration, the head of the first conductive member and the second conductive member are connected to each other by joining the abutting surfaces to each other by friction stir welding along the abutting surfaces. Therefore, energy necessary for friction stir welding is reduced to a low level. The abutting surfaces herein mean the outer surface of the projection of the first conductive member and the inner surface of the hole of the second conductive member that face each other in a direction intersecting the penetration direction (direction in which the projection is inserted or fitted into the hole) of the projection toward the hole.

In this case, the configuration may be such that the projection non-circularly projects, and the hole forms a non-circular opening.

According to such a configuration, the projection is inserted or fitted into the hole, thereby allowing the head of the first conductive member and the second conductive member to be joined together by friction stir welding while they are prevented from rotating.

Further, according to still another aspect of the present invention, the electric storage device may be configured so that the recess is formed through the second conductive member, and an upper surface of the head of the first conductive member and an upper surface of the second conductive member are flush with each other.

According to such a configuration, there are no members or parts projecting on the upper surface of the second conductive member. Therefore, the space outside the case can be saved.

Further, according to another aspect of the present invention, the electric storage device may be configured so that the projection is formed on the head of the first conductive member, the hole is formed through the second conductive member, and an upper surface of the projection of the first conductive member and an upper surface of the second conductive member are flush with each other.

According to such a configuration, there are no members or parts projecting on the upper surface of the second conductive member. Therefore, the space outside the case can be saved.

An electric storage device according to the present invention includes: an electrode assembly including a positive electrode plate and a negative electrode plate insulated from each other; a case constituted by a partition wall and housing the electrode assembly; a first conductive member passing through the partition wall and electrically connected to the electrode assembly inside the case; and a second conductive member arranged outside the case and electrically connected to the first conductive member, wherein the first conductive member includes an inserted part inserted through the partition wall and a head bulging from the inserted part, the first conductive member is formed using a first metal material, the second conductive member is formed using a second metal material that is different from the first conductive member, and the second conductive member is fixed to the head of the first conductive member via a nugget part in which the first metal material and the second metal material are mixed.

According to such a configuration, the second conductive member is fixed to the head bulging from the inserted part of the first conductive member so that a large contact area is ensured between the second conductive member and the first conductive member. The first conductive member and the second conductive member are connected by joining different kinds of metals to each other. Since the contact resistance between the first conductive member and the second conductive member is low, the second conductive member is well joined to the first conductive member via the nugget part in which different metals are mixed.

An electric storage device assembly according to the present invention includes at least two electric storage devices including at least one electric storage device as described above; and a coupling member configured to couple the electric storage devices to each other.

A method for producing an electric storage device according to the present invention includes: fixing the second conductive member to the head of the first conductive member by friction stir welding; and fixing the first conductive member to which the second conductive member has been fixed to the partition wall of the case by inserting the first conductive member therethrough.

In the case where fixing the head of the first conductive member and the second conductive member by friction stir welding and fixing the first conductive member to the partition wall of the case are performed in a reversed order, the work force of the friction stir welding may possibly affect the fixing state of the first conductive member to the partition wall of the case. In this case, the air tightness of the case decreases. However, the present invention is free from such a problem. Moreover, the present invention also can eliminate the influence of frictional heat due to the friction stir welding on the electrode assembly.

In this way, the first conductive member and the second conductive member are well joined, even if the first conductive member and the second conductive member are different kinds of metals.

Hereinafter, a battery cell as an embodiment of the electric storage device according to the present invention is described with reference to the drawings. As a conventional technique, an example in which a crimping terminal of a lead wire of an external device is clamped to a shaft of an external terminal is described. In the conventional technique, the external device and the battery cell are electrically connected to each other. Such a connection method is generally called screw tightening. However, this embodiment describes an example of an assembled battery 1 including a plurality of battery cells 2 assembled in parallel alignment in which a conductive member 12 of a terminal structure 9 of one battery cell 2 and a conductive member 12 of a terminal structure 9 of another battery cell 2 are coupled to each other by a coupling member 15, as shown in FIG. 1. In this case, the two battery cells 2 are connected to each other. This connection method is called welding. More specifically, the plurality of battery cells 2 are electrically connected in series. Conductive members 12 (conductor connection parts 14a) of terminal structures 9 of each two adjacent battery cells 2 of the plurality of battery cells 2 are joined together, for example, by welding the coupling member 15. Accordingly, the plurality of battery cells 2 are coupled to each other. The coupling member 15 is preferably a bus bar obtained by forming a conductive metal material into a plate shape. The bus bar has one end welded to a conductive member 12 (conductor connection part 14a) of the terminal structure 9 on the positive electrode side of one battery cell 2. The bus bar has the other end welded to a conductive member 12 (conductor connection part 14a) of the terminal structure 9 on the negative electrode side of the other battery cell 2.

The battery cell 2 according to this embodiment is a non-aqueous electrolyte secondary battery cell, more specifically, a lithium ion secondary battery cell. As shown in FIG. 1 to FIG. 6, the battery cell 2 according to this embodiment includes a case 3. The case 3 includes a case body 3a and a cover plate 3b configured to close an opening of the case body 3a. Further, the case body 3a is sealed by the cover plate 3b. The terminal structures 9 are provided on the cover plate 3b. The terminal structures 9 are electrically connected to an electrode assembly 4 housed in the case 3.

The case body 3a and the cover plate 3b of the case 3 are formed using an aluminum-based metal material such as aluminum or aluminum alloy. The case body 3a houses the electrode assembly 4 wound into an elongated cylindrical shape. Therefore, the case body 3a has a shape of a bottomed rectangular cylindrical body that is flattened in the width direction. The cover plate 3b is a plate member having a rectangular shape corresponding to the opening of the case body 3a. The cover plate 3b is fitted into the opening of the case body 3a. The cover plate 3b is fixed to the edge of the opening, for example, by laser welding. That is, the cover plate 3b closes the opening of the case body 3a. The case 3 is sealed by the cover plate 3b.

The electrode assembly 4 includes a strip-shaped positive electrode sheet 5, a strip-shaped negative electrode sheet 6, and a strip-shaped separator 7 interposed between the positive electrode sheet 5 and the negative electrode sheet 6. With the strip-shaped separator 7 interposed between the strip-shaped positive electrode sheet 5 and the strip-shaped negative electrode sheet 6, the strip-shaped positive electrode sheet 5 and the strip-shaped negative electrode sheet 6 are shifted from each other laterally in different directions. The electrode assembly 4 is formed by winding them into an elongated cylindrical shape that forms a vertically elongated circle with the lateral rotation axis at the center. The electrode assembly 4 is entirely covered by an insulating cover (not shown) formed using an insulating sheet. While the electrode assembly 4 and the case 3 are insulated from each other, the electrode assembly 4 is housed in the case 3. The positive electrode sheet 5 includes an aluminum foil and a positive electrode active material carried on the surface of the aluminum foil. The negative electrode sheet 6 includes a copper foil and a negative electrode active material carried on the surface of the copper foil. The positive electrode sheet 5 and the negative electrode sheet 6 each have an active material uncoated portion on the left or right end edge in the shifted direction. In this way, the aluminum foil and the copper foil are exposed on the left and right ends of the electrode assembly 4. The thus exposed electrode metal foils are protruding (projecting) from the left and right ends of the electrode assembly 4 while they are wound into bundles.

Further, current collectors 8 are electrically connected respectively to the metal foils protruding from the left and right ends of the electrode assembly 4. The current collectors 8 are vertically elongated conductive metal members. More specifically, a positive current collector 8 is formed using aluminum or aluminum alloy. A negative current collector 8 is formed using copper or copper alloy. Each of the current collectors 8 has an upper part that is horizontally bent to serve as a connection part 8a. A part lower than the connection part 8a projects downwardly while being divided into two on the front and back sides. The part divided into two and an end of the electrode assembly 4 are sandwiched by clip plates, which are not shown. The part divided into two and the end of the electrode assembly 4 are connected to each other, for example, by ultrasonic welding so as to be fixed.

The terminal structures 9 include a positive terminal structure 9 and a negative terminal structure 9. As shown in detail in FIG. 3 and FIG. 4, each terminal structure 9 includes a resin plate 10 and an outer gasket (gasket) 11 that are respectively arranged inside and outside the case 3, a rivet member 13 that is electrically connected to the connection part 8a of the current collector 8 within the case 3, and an external terminal 14 that is arranged on the outer surface of the cover plate 3b and that is electrically connected to the rivet member 13. Thus, the electrode assembly 4 inside the case 3 and the external terminal 14 are electrically connected to each other. The rivet member 13 and the external terminal 14 are integrally formed by friction stir welding. The rivet member 13 and the external terminal 14 constitute a conductive member 12. The conductive member 12 is arranged inside and outside the case 3 by passing through a through hole 3c of the cover plate 3b. The rivet member 13 corresponds to the first conductive member. The external terminal 14 corresponds to the second conductive member.

The resin plate 10 and the outer gasket 11 are arranged so as to sandwich, from inside and outside the case 3, the through hole 3c that is formed on each of the left and right ends of the cover plate 3b. The resin plate 10 is a synthetic resin member at least having insulating properties. More specifically, a thermoplastic resin material is, for example, used for the resin plate 10. The thermoplastic resin material is obtained by uniformly mixing, with a polyphenylene sulfide (PPS) resin, a polyolefin-based elastomer composed of at least one of polyethylene (PE) and polypropylene (PP). The resin plate 10 has a rectangular shape. On the lower surface of the resin plate 10, a recess 10a capable of receiving the connection part 8a of the current collector 8 is formed. The resin plate 10 has a through hole 10b. The through hole 10b of the resin plate 10 coincides with a through hole 8b formed in the connection part 8a of the current collector 8 in the state where the connection part 8a is received by the recess 10a.

The outer gasket 11 is a synthetic resin member. The synthetic resin member has insulating properties and sealing properties. More specifically, a thermoplastic resin material is, for example, used for the outer gasket 11. The outer gasket 11 has a rectangular shape that is one size larger than the external terminal 14. On the outer perimeter of the outer gasket 11, an outer wall 11a having the peripheral shape is provided. The outer wall 11a is formed by recessing the upper surface of the outer gasket 11 except the outer peripheral portion. A recess 11b capable of receiving a head 13c of the rivet member 13 and the external terminal 14 is provided inside the outer wall 11a of the outer gasket 11. The outer gasket 11 has a through hole 11c. The through hole 11c has a shape that allows a swaged part 13b, which will be described below, of the rivet member 13 to be inserted therethrough, in the state where the head 13c of the rivet member 13 and the external terminal 14 are received by the recess 11b. An annular projection 11d is formed on the lower surface of the outer gasket 11. The annular projection 11d is inserted through the through hole 3c of the cover plate 3b. The annular projection 11d inserted through the through hole 3c of the cover plate 3b is further inserted into the through hole 10b of the resin plate 10.

The resin plate 10 is arranged on the lower surface (inner surface) of the cover plate 3b. As a result, the resin plate 10 is arranged inside the case 3. The outer gasket 11 is arranged on the upper surface (outer surface) of the cover plate 3b. As a result, the outer gasket 11 is arranged on the outer surface of the case 3. In a region of the upper surface of the cover plate 3b in which the outer gasket 11 is arranged, a non-circular recess 3d capable of receiving a lower part (bridge part) of the outer gasket 11 is formed. Then, the lower part of the outer gasket 11 (joint surface with the cover plate 3b) is inserted into the recess 3d, thereby restricting the rotation of the outer gasket 11 about its axis. In this embodiment, the recess 3d is formed into a rectangular shape corresponding to the rectangular shape of the lower part of the outer gasket 11. Further, the recess 3d is, for example, formed by coining.

The rivet member 13 is inserted through the through hole 3c via the resin plate 10 and the outer gasket 11. The rivet member 13 is a conductive metal member. More specifically, the rivet member 13 on the positive electrode side is formed using aluminum or aluminum alloy. The rivet member 13 on the negative electrode side is formed using copper or copper alloy. The rivet member 13 includes an inserted part 13a inserted through the cover plate (partition wall) 3b and the head 13c bulging from the inserted part 13a.

The inserted part 13a includes the swaged part 13b on the side where it is inserted through the cover plate 3b. The swaged part 13b projects downwardly from the lower surface of the head 13c. In this embodiment, the swaged part 13b has a hollow (cylindrical) shape. More specifically, the swaged part 13b has a circular cylindrical shape. However, the shape of the swaged part 13b is not limited to this shape. The swaged part 13b may have a solid (columnar) shape, and more specifically, may have a circular columnar shape.

The head 13c has a flat surface 13d at least in a portion facing the external terminal 14. The head 13c is formed into a substantially circular columnar shape. The flat surface 13d is concentric with the center of the head 13c. Specifically, the flat surface 13d is formed into a circular shape that is concentric with the center of the head 13c. The flat surface 13d extends over the entire region of the upper surface of the head 13c. The head 13c has a length in its center axis direction, that is, a thickness such that it can withstand swaging of the swaged part 13b.

The external terminal 14 serves to provide electrical connection to an external device. In this embodiment, the external terminal 14 is formed into a rectangular plate shape that is larger than the upper surface of the head 13c of the rivet member 13. The external terminal 14 is formed using aluminum or aluminum alloy. In this embodiment, the external terminal 14 is formed using a metal material that is different from the material of the rivet member 13 on the negative electrode side. On the upper surface of the external terminal 14, a conductor connection part 14a for connecting the external device by welding or the like is provided.

The external terminal 14 is fixed to the head 13c of the rivet member 13 by friction stir welding. Specifically, the external terminal 14 has a flat surface 14b at least in a portion facing the head 13c of the rivet member 13. In this embodiment, the flat surface 14b extends over the entire region of the lower surface of the external terminal 14. The flat surface 14b of the external terminal 14 and the flat surface 13d of the head 13c of the rivet member 13 are joined together by friction stir welding.

Figure 6:
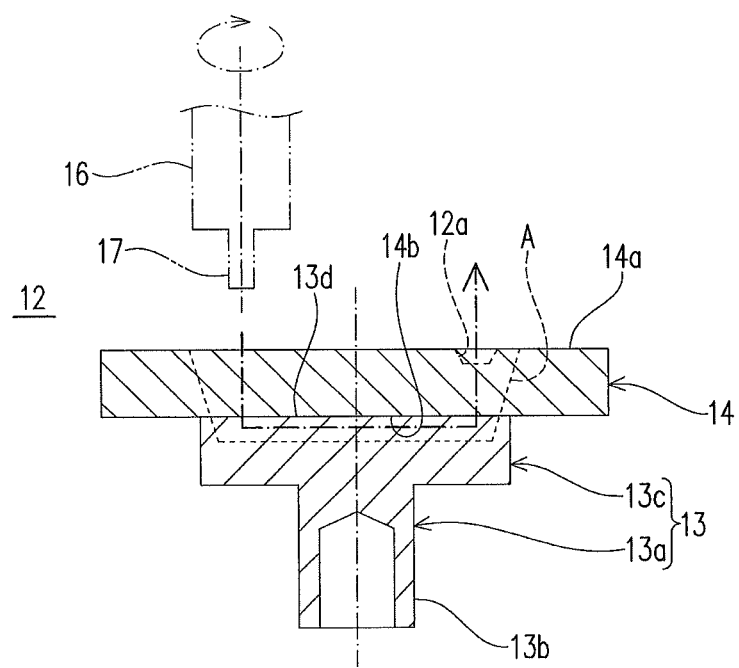
FIG. 6 is a detailed view showing the junction between a rivet member and an external terminal according to the aforementioned embodiment.

Specifically, as shown in FIG. 6, the external terminal 14 is fixed to the head 13c of the rivet member 13 with the flat surface 14b abutting the flat surface 13d of the rivet member 13. Then, a tool 16 having a projection called a probe 17 at the center of its tip is abutted against the flat surface 13*d* while rotating about the axial center. The tool 16 has a projection called the probe 17 at the center of the tip. Further, the tool 16 penetrates the flat surface 13*d* in the axis direction, while giving frictional heat. The flat surface 13*d* is plasticized into a viscous state, so that the rivet member 13 and the external terminal 14 are joined together. In this embodiment, the tool 16 penetrates the external terminal 14 from the conductor connection part 14*a* side over the flat surface 13*d* of the rivet member 13. Thus, the rivet member 13 and the external terminal 14 are joined together by friction stir welding.

Figure 5:
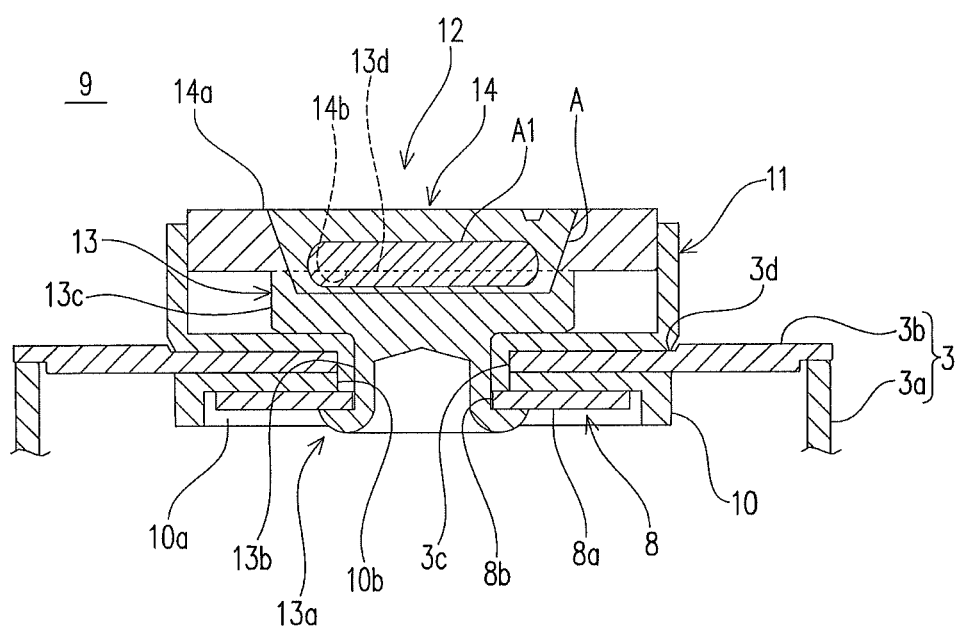
FIG. 5 is an enlarged lateral sectional view showing the terminal structure of the battery cell after the friction stir welding.

In this embodiment, friction stir welding is used when the rivet member 13 and the external terminal 14 are joined together. Therefore, as shown in FIG. 5, a nugget part A1 is formed in a joint part A between the rivet member 13 and the external terminal 14. In the nugget part A1, a first metal material used for the rivet member 13 and a second metal material used for the external terminal 14 are mixed. In other words, the rivet member 13 and the external terminal 14 are joined together via the nugget part A1 in which the first metal material and the second metal material are mixed.

The nugget part A1 is a portion where recovery and recrystallization occur due to high-temperature heat and large deformation amount, and is also called a dynamic recrystallization part. The nugget part A1 is different from a portion that is subjected to general welding in which melting is caused by heat. The nugget part A1 is formed by dynamically recrystallizing a material by frictional heat and stirring.

The rivet member 13 and the external terminal 14 may be joined together by friction stir welding by moving the tool 16 over the entire region of the head 13*c* of the rivet member 13. Thus, the joint part A having a substantially circular shape is formed over the entire region of the flat surface 13*d* of the head 13*c*. Further, the rivet member 13 and the external terminal 14 may be joined together by friction stir welding by circularly moving the tool 16 along the end edge of the flat surface 13*d* of the head 13*c* of the rivet member 13. Thus, the joint part A having an annular shape is formed along the end edge of the flat surface 13*d* of the head 13*c*. The rivet member 13 and the external terminal 14 may be joined together by friction stir welding by circularly moving the tool 16 along the end edge of the flat surface 13*d* of the head 13*c* of the rivet member 13. Thus, the joint part A having an annular shape is formed along the end edge of the flat surface 13*d* of the head 13*c*. The rivet member 13 and the external terminal 14 may be joined together by friction stir welding by moving the tool 16 to a point or a part on the end edge of the flat surface 13*d* of the head 13*c* of the rivet member 13. Thus, the joint part A is formed at a point or a plurality of points, independently, on the end edge of the flat surface 13*d* of the head 13*c*. A welding groove 12*a* is formed at a position where the tool 16 is withdrawn from the conductive member 12.

Further, the rivet member 13 and the external terminal 14 are fixed to each other by friction stir welding by joining the external terminal 14 to the head 13*c* of the rivet member 13. Thereafter, they are assembled to the case 3. That is, the swaged part 13*b* of the rivet member 13 in the conductive member 12 in which the rivet member 13 and the external terminal 14 are integrated is inserted through the through hole 11*c* of the outer gasket 11, the through hole 3*c* of the cover plate 3*b*, and the through hole 8*b* of the connection part 8*a* of the current collector 8. Then, the swaged part 13*b* is swaged from below. Thus, the conductive member 12 and the current collector 8 are electrically connected to each other.

Here, descriptions associated with dimensions of the through hole 3*c* of the cover plate 3*b*, the through hole 8*b* of the connection part 8*a* of the current collector 8, the through hole 10*b* of the resin plate 10, the through hole 11*c* and the annular projection 11*d* of the outer gasket 11, and the swaged part 13*b* of the rivet member 13 are given. As shown in detail in FIG. 4, the internal diameter of the through hole 3*c* of the cover plate 3*b* is the same or substantially the same as the internal diameter of the through hole 10*b* of the resin plate 10. Further, the internal diameter of the through hole 3*c* of the cover plate 3*b*, the internal diameter of the through hole 10*b* of the resin plate 10, or the like is the same or substantially the same as the outer diameter of the annular projection 11*d* of the outer gasket 11. Further, the length of the annular projection 11*d* of the outer gasket 11 is the same or substantially the same as the total thickness of the cover plate 3*b* and the resin plate 10. Further, the internal diameter of the annular projection 11*d* of the outer gasket 11 is the same or substantially the same as the diameter of the through hole 8*b* of the connection part 8*a* of the current collector 8. Further, the internal diameter of the annular projection 11*d* of the outer gasket 11, the diameter of the through hole 8*b* of the connection part 8*a* of the current collector 8, or the like is the same or substantially the same as the outer diameter of the swaged part 13*b* of the rivet member 13. Further, the length of the swaged part 13*b* of the rivet member 13 is the same or substantially the same as the total thickness of the cover plate 3*b*, the connection part 8*a* of the current collector 8, the resin plate 10, and the outer gasket 11.

Accordingly, the head 13*c* of the rivet member 13 is inserted into the recess 11*b* of the outer gasket 11 from outside to inside the case 3. The swaged part 13*b* passes through the through hole 11*c* at the bottom of the recess 11*b* and is inserted through the through hole 8*b* of the connection part 8*a* of the current collector 8. The tip portion of the swaged part 13*b* projecting downwardly through the through hole 8*b* of the connection part 8*a* is swaged from below. This allows the rivet member 13 to be electrically connected to the connection part 8*a* of the current collector 8. Further, the rivet member 13 is attached to the cover plate 3*b* while it is insulated from the cover plate 3*b*.

In this way, the external terminal 14 according to this embodiment is fixed to the head 13*c* bulging from the inserted part 13*a* of the rivet member 13, so that a large contact area is ensured between the external terminal 14 and the rivet member 13. The rivet member 13 on the negative electrode side and the external terminal 14 are connected by joining different kinds of metals to each other. Since the contact resistance between the rivet member 13 on the negative electrode side and the external terminal 14 is low, the external terminal 14 is joined well to the rivet member 13 by friction stir welding.

Further, the rivet member 13 and the external terminal 14 are joined together by friction stir welding, thereby forming the conductive member 12. Thereafter, the conductive member 12 and the electrode assembly 4 are connected to each other. Therefore, the electrode assembly 4 is not affected by frictional heat when the external terminal 14 is joined to the inserted part 13*a* of the rivet member 13 by friction stir welding. Further, the flat surface 13*d* of the head 13*c* of the rivet member 13 and the flat surface 14*b* of the external terminal 14 are joined together. Therefore, gaps between the flat surface 13*d* of the rivet member 13 and the flat surface 14*b* of the external terminal 14 are difficult to be formed. Further, the contact resistance between the flat surface 13*d* of the rivet member 13 and the flat surface 14b of the external terminal 14 is reduced to a low level.

Further, in the conductive member 12 according to this embodiment, the swaged part 13b of the rivet member 13 is swaged while the rivet member 13 and the external terminal 14 are integrated together. Therefore, after the swaged part 13b is swaged, there is no chance that a large external force is applied to the conductive member 12. This prevents loss of air tightness of the cover plate 3b at points through which the conductive member 12 passes.

The electric storage device according to the present invention is not limited to the aforementioned embodiment, and various modifications can be made without departing from the gist of the present invention.

For example, in the aforementioned embodiment, an example in which the head 13c of the rivet member 13 has a substantially columnar shape, and the external terminal 14 has a plate shape is described. However, the combination of the shapes of the head of the rivet member and the external terminal is not limited to this example. That is, one of the head of the rivet member (first conductive member) and the external terminal (second conductive member) may have a projection. Further, the other of the head of the rivet member (first conductive member) and the external terminal (second conductive member) may have a hole in which the projection penetrates (is inserted or fitted).

Figure 7:
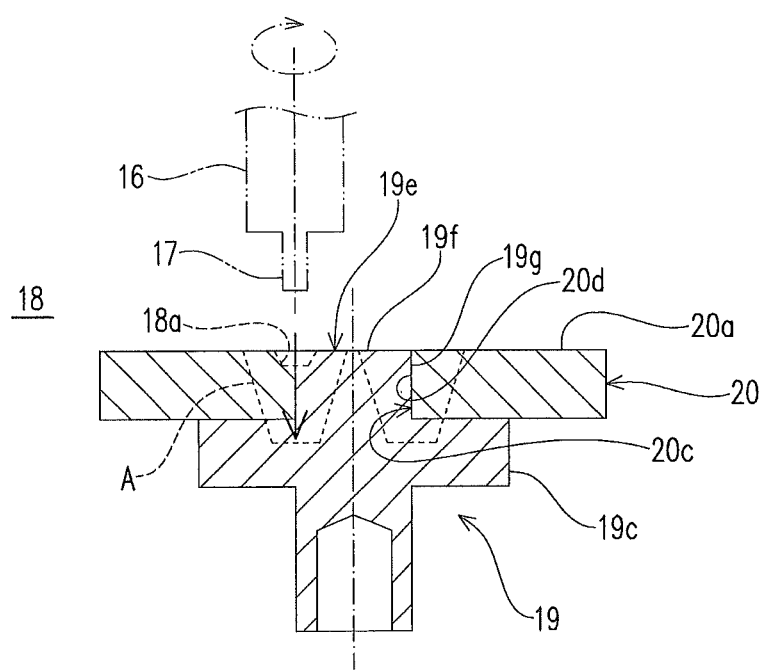
FIG. 7 is a detailed view showing another example of the junction between the rivet member and the external terminal.

That is, as shown in FIG. 7, a head 19c of a rivet member 19 has a projection 19e having a substantially columnar shape. The projection 19e is concentric with the center of the head 19c having a substantially columnar shape. The length in the center axis direction of the projection 19e is substantially the same as the thickness of an external terminal 20. Therefore, an upper end face 19f of the projection 19e projecting from the head 19c of the rivet member 19 and a conductor connection part 20a (surface) of the external terminal 20 are flush with each other.

The external terminal 20 has a recess 20c housing at least a part of the head 19c of the rivet member 19. Specifically, the projection 19e of the head 19c of the rivet member 19 is inserted into the recess 20c. The recess 20c is a substantially circular hole having substantially the same diameter as the outer diameter of the projection 19e so that the projection 19e is in tight contact with the inner circumferential surface of the recess 20c without gaps. That is, the recess 20c is a substantially circular through hole extending from the lower surface facing the rivet member 19 to the upper surface on the opposite side.

The abutting surfaces of at least a part of the head 19c of the rivet member 19 and the recess 20c of the external terminal 20 are joined to each other by friction stir welding, thereby forming a conductive member 18. Specifically, the projection 19e of the head 19c of the rivet member 19 is inserted into the recess (hole) 20c of the external terminal 20. Then, abutting surfaces 19g and 20d of the projection 19e and the recess 20c are joined to each other by friction stir welding. The abutting surface 19g on the head 19c side of the rivet member 19 is the circumferential side surface of the head 19c. The abutting surface 20d on the recess 20c side of the external terminal 20 is the inner circumferential surface of the recess 20c. That is, the tool 16 penetrates the abutting surfaces 19g and 20d of the head 19c of the rivet member 19 and the recess 20c of the external terminal 20 in the depth direction (vertically). The tool 16 circularly moves along the circumferential direction of the abutting surfaces 19g and 20d, and the projection 19e of the head 19c of the rivet member 19 and the external terminal 20 are joined together by friction stir welding. Therefore, the joint part A having an annular shape is formed in the conductive member 18 in which the rivet member 19 and the external terminal 20 are joined together. A welding groove 18a is formed at a position where the tool 16 is withdrawn from the conductive member 18.

In this way, the recess 20c of the external terminal 20 is used in friction stir welding for positioning the external terminal 20 with respect to the head 19c of the rivet member 19. Further, the rivet member 19 and the external terminal 20 are joined together by friction stir welding along the abutting surfaces 19g and 20d without the tool 16 penetrating the joint surface between the external terminal 20 and the head 19c of the rivet member 19. Therefore, energy necessary for friction stir welding is reduced to a low level. Friction stir welding is enabled without the probe 17 of the tool 16 penetrating the head 19c of the rivet member 19. Therefore, the height in the axial center direction of the head 19c is reduced to a low level. Further, the abutting surfaces 19g and 20d are optically detected, and are used as references for positioning the probe 17 of the tool 16 during penetration of the tool 16. Further, the projection 19e of the head 19c of the rivet member 19 does not project on the upper surface of the external terminal 20. Therefore, the space outside the case 3 also can be saved.

Figure 8:
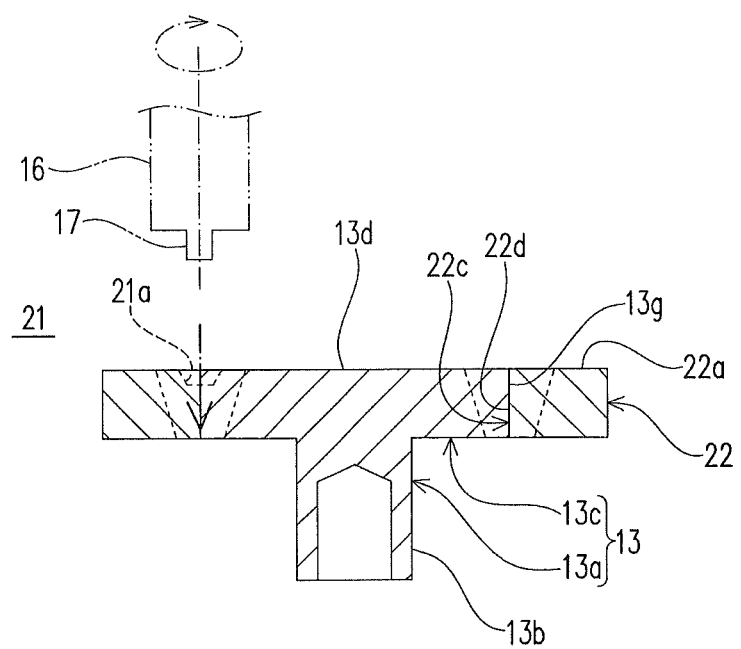
FIG. 8 is a detailed view showing another example of the junction between the rivet member and the external terminal.

Further, as shown in FIG. 8, an external terminal 22 has a recess 22c housing the head 13c of the rivet member 13 of the aforementioned embodiment. Specifically, the head 13c of the rivet member 13 is inserted into the recess 22c. The head 13c is in tight contact with an abutting surface 22d of the recess 22c without gaps. The recess 22c is a substantially circular hole having substantially the same diameter as the outer diameter of the head 13c. That is, the recess 22c is a substantially circular through hole extending from the lower surface to the upper surface on the opposite side. Further, the thickness of the external terminal 22 is substantially the same as the length in the axial center direction of the head 13c of the rivet member 13. Therefore, the flat surface 13d of the head 13c of the rivet member 13 and a conductor connection part 22a (surface) of the external terminal 20 are flush with each other.

Then, the head 13c of the rivet member 13 is inserted into the recess (hole) 22c of the external terminal 22. Abutting surfaces 13g and 22d of the head 13c and the recess 22c are joined to each other by friction stir welding. Thus, a conductive member 21 including the rivet member 13 and the external terminal 22 is formed. The abutting surface 13g on the head 13c side of the rivet member 13 is the circumferential side surface of the head 13c. The abutting surface 22d on the recess 22c side of the external terminal 22 is the inner circumferential surface of the recess 22c. Then, the tool 16 penetrates the abutting surfaces 13g and 22d of the head 13c of the rivet member 13 and the recess 22c of the external terminal 22. The tool 16 circularly moves along the circumferential direction of the abutting surfaces 13g and 22d. In this way, the abutting surfaces 13g and 22d are joined to each other by friction stir welding, and therefore the joint part A having an annular shape is formed in the conductive member 21. A welding groove 21a is formed at a position where the tool 16 is withdrawn from the conductive member 21.

In this way, the recess 22c of the external terminal 22 is used in friction stir welding for positioning the external terminal 22 with respect to the axial center direction of the head 13c of the rivet member 13. Further, the rivet member 13 and the external terminal 22 are joined together by performing friction stir welding along the abutting surfaces 13g and 22d. Further, energy necessary for friction stir welding is reduced to a low level. Further, the rivet member 13 and the external terminal 22 are joined to each other via the nugget part A1 in which different metals are mixed. Therefore, the contact area between different kinds of metals increases. Further, the contact resistance between the rivet member 13 and the external terminal 22 is reduced to a low level.

Figure 9:
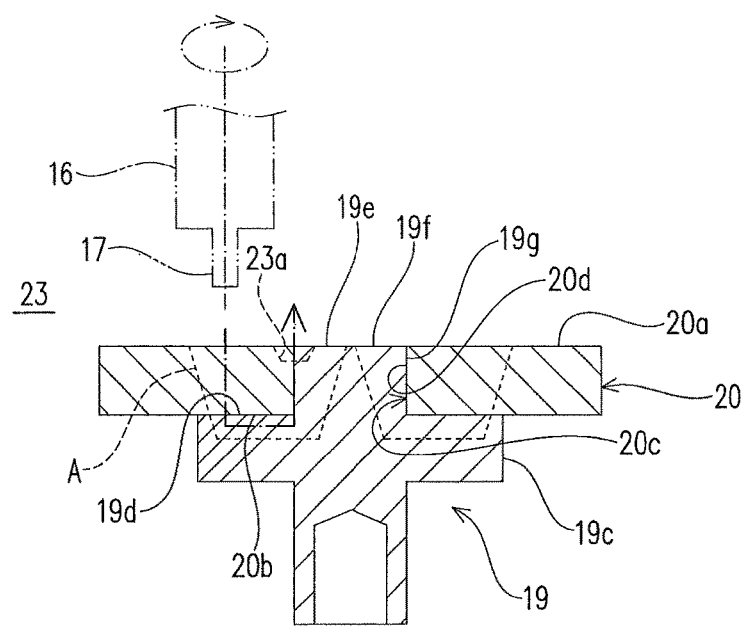
FIG. 9 is a detailed view showing another example of the junction between the rivet member and the external terminal.

Using the rivet member 19 and the external terminal 20 shown in FIG. 7 as they are, a conductive member 23 in which flat surfaces 19d and 20b on which the rivet member 19 and the external terminal 20 face each other, in addition to the abutting surfaces 19g and 20d of the head 19c of the rivet member 19 and the recess 20c of the external terminal 20, are joined together by friction stir welding may be formed, as shown in FIG. 9. A welding groove 23a is formed at a position where the tool 16 is withdrawn from the conductive member 23. In this way, the joint part A of the conductive member 23 is larger than the joint part A of the conductive member 18 shown in FIG. 7. The bonding strength of the joint part A of the conductive member 23 increases. Further, the electric resistance value of the joint part A of the conductive member 23 decreases. The flat surface 19d of the rivet member 19 is on the upper surface of the head 19c. The flat surface 19d is an annular surface excluding the projection 19e provided at the center of the head 19c. The flat surface 20b of the external terminal 20 is a portion facing at least the flat surface 19d of the rivet member 19. In this embodiment, the flat surface 20b of the external terminal 20 is provided extending over the entire region facing the rivet member 19.

Figure 10:
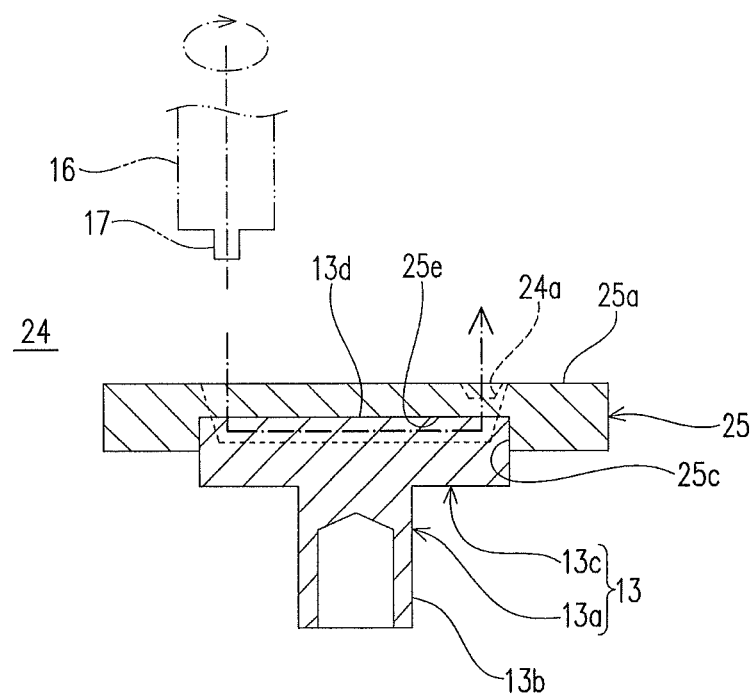
FIG. 10 is a detailed view showing another example of the junction between the rivet member and the external terminal.

Further, as shown in FIG. 10, an external terminal 25 has a recess 25c housing a part of the head 13c of the rivet member 13 of the aforementioned embodiment. Specifically, the recess 25c is a substantially circular hole recessed from the lower surface toward the upper surface on the opposite side. The upper part of the head 13c of the rivet member 13 is inserted into the recess 25c. The recess 25c is a substantially circular hole. The hole of the recess 25c has substantially the same diameter as the outer diameter of the head 13c. Then, the upper part of the head 13c and the inner circumferential surface of the recess 25c are in tight contact without gaps. The head 13c of the rivet member 13 is fitted into the recess 25c of the external terminal 25. The flat surface 13d of the head 13c of the rivet member 13 and a flat surface 25e formed at the bottom of the recess 25c of the external terminal 25 are joined together by friction stir welding. Thus, a conductive member 24 is formed. A welding groove 24a is formed at a position where the tool 16 is withdrawn from the conductive member 24.

In this way, the recess 25c of the external terminal 25 is used in friction stir welding for positioning the external terminal 25 with respect to the head 13c of the rivet member 13. Further, the rivet member 13 does not project on the upper surface of the external terminal 25 (on a conductor connection part 25a side). Therefore, the space outside the case 3 also can be saved.

Figure 11:
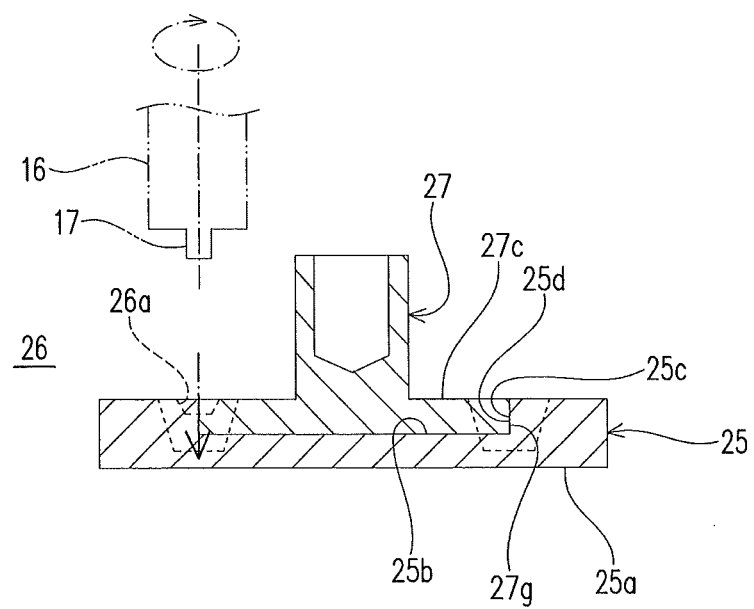
FIG. 11 is a detailed view showing another example of the junction between the rivet member and the external terminal.

As shown in FIG. 11, the length (thickness) in the axial center direction of a head 27c of a rivet member 27 may be set to be the same as the depth of the recess 25c, so that the head 27c of the rivet member 27 is housed in the recess 25c of the external terminal 25. Further, the external terminal 25 may be configured so that the head 27c of the rivet member 27 is fitted into the recess 25c.

In this way, the tool 16 penetrates abutting surfaces 27g and 25d of the head 27c of the rivet member 27 and the recess 25c of the external terminal 25 from the rivet member 27 side toward the external terminal 25. The head 27c of the rivet member 27 and the external terminal 25 are joined together by friction stir welding. Thus, a conductive member 26 is formed on the lower surface side (the cover plate 3b side). A welding groove 26a is formed at a position where the tool 16 is withdrawn from the conductive member 26. That is, the joint part A and the welding groove 26a are not formed in the conductor connection part 25a of the external terminal 25. Therefore, the flatness of the conductor connection part 25a is not impaired by friction stir welding.

Figure 12:
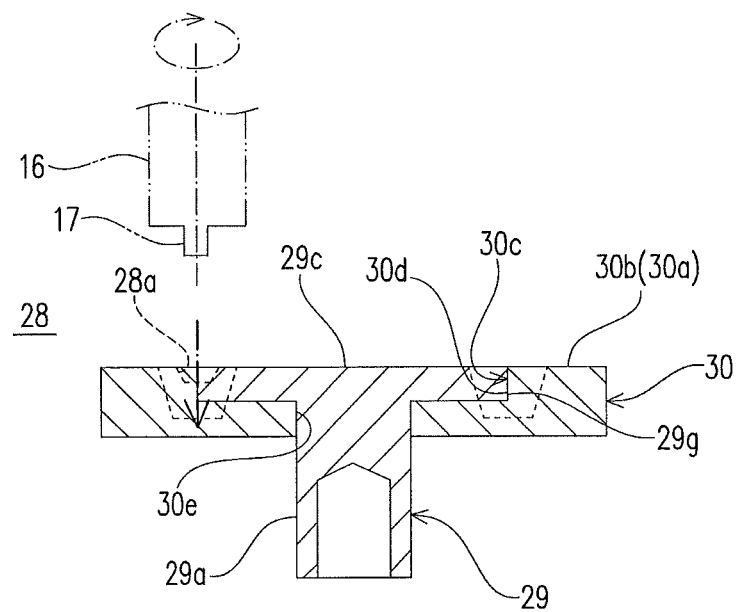
FIG. 12 is a detailed view showing another example of the junction between the rivet member and the external terminal.

Further, the recess 20c of the external terminal 20 may be formed passing through the rivet member 19, and the upper surface of the head 19c of the rivet member 19 and the upper surface of the rivet member 19 may be flush with each other. That is, as shown in FIG. 12, an external terminal 30 includes a conductor connection part 30a having a flat surface 30b on its upper surface, a recess 30c into which a head 29c of a rivet member 29 can be fitted, and a hole 30e through which an inserted part 29a of the rivet member 29 can be inserted. The inserted part 29a of the rivet member 29 is inserted through the hole 30e of the external terminal 30. Then, the rivet member 29 passes through the external terminal 30. Further, the head 29c of the rivet member 29 is fitted into the recess 30c of the external terminal 30. The upper surface of the head 29c of the rivet member 29 and the upper surface (flat surface 30b) of the conductor connection part 30a of the external terminal 30 are flush with each other. Abutting surfaces 29g and 30d of the head 29c of the rivet member 29 and the recess 30c of the external terminal 30 are joined to each other by friction stir welding. A conductive member 28 may be formed in this way. A welding groove 28a is formed at a position where the tool 16 is withdrawn from the conductive member 28.

Figure 13:
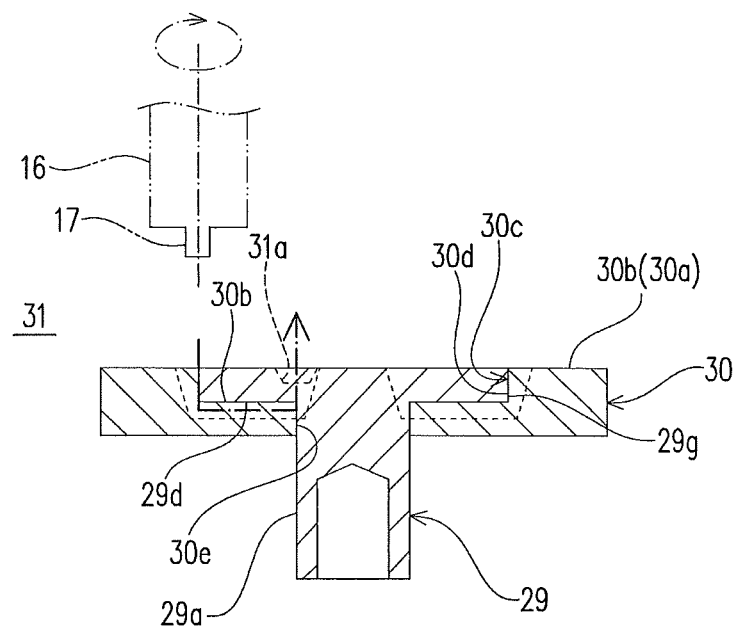
FIG. 13 is a detailed view showing another example of the junction between the rivet member and the external terminal.

Further, as shown in FIG. 13, a conductive member 31 may be formed by joining the abutting surfaces 29g and 30d of the head 29c of the rivet member 29 and the recess 30c of the external terminal 30 to each other, and joining the lower surface of the head 29c of the rivet member 29 and the bottom surface of the recess 30c of the external terminal 30 to each other, by friction stir welding. A welding groove 31a is formed at a position where the tool 16 is withdrawn from the conductive member 31.

Figure 14:
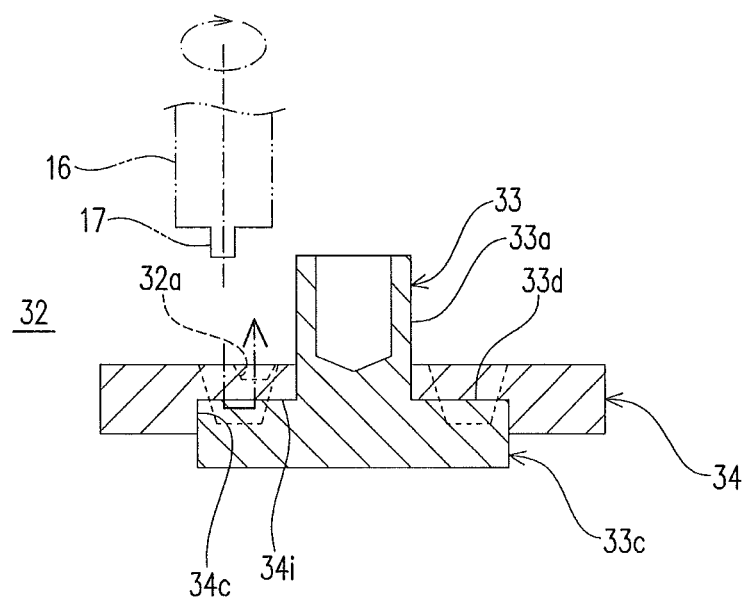
FIG. 14 is a detailed view showing another example of the junction between the rivet member and the external terminal.

Further, as shown in FIG. 14, a flat surface 33d of a head 33c of a rivet member 33 may be provided on the lower surface on an inserted part 33a side (surface on the upper side in the figure) of the head 33c. Corresponding to the rivet member 33, a recess 34c having a through hole 34h through which the inserted part 33a of the rivet member 33 can be inserted may be provided in an external terminal 34. The recess 34c is capable of housing a part of the head 33c in the state where the inserted part 33a of the rivet member 33 is inserted through the through hole 34h. A flat surface 34i is provided at the bottom of the recess 34c. The flat surface 34i abuts the flat surface 33d of the head 33c of the rivet member 33. Then, the flat surfaces 33d and 34i are joined to each other by friction stir welding. Thus, a conductive member 32 may be formed. A welding groove 32a is formed at a position where the tool 16 is withdrawn from the conductive member 32.

Further, the shape of the recess of such an external terminal is not limited to a circular shape. The shape of the recess of the external terminal may form a non-circular opening. Even in the case where the recess is circular as viewed in the center axis direction, if the recessed portion of the recess is formed at a position displaced from the center axis, the shape of the recess is non-circular with respect to the center axis. Therefore, when the swaged part of the inserted part is swaged while the head of the rivet member is supported by means such as a tool and a jig, the rotational movement of the conductive member about the center axis due to the swaging force applied to the swaged part can be restricted by the means such as a tool and a jig. This prevents the conductive member from incautiously rotating with respect to the cover plate in the swaging. Also in the case where the projection shown in FIG. 7 and FIG. 9 non-circularly projects, and the hole forms a non-circular opening, the same effect is exerted.

Further, in the aforementioned embodiment, the shape of the head 13c of the rivet member 13 is described as being circular. However, the head needs only to bulge from the inserted part. Specifically, the head may have a shape such as circular, elliptical, and rectangular that is larger than the diameter of the inserted part.

Further, in the aforementioned embodiment, an example in which the positive current collector 8 and the positive conductive member 12 are formed using aluminum or aluminum alloy is described. Further, an example in which the negative current collector 8 and the negative conductive member 12 are formed using copper or copper alloy is described. However, these materials may be arbitrarily selected as long as they are conductive metal materials corresponding to the type of the battery cell. Further, in the aforementioned embodiment, the material of the external terminal 14 is also exemplified. However, such a material also may be arbitrarily selected as long as it is a conductive metal material having suitable properties such as strength and conductivity.

Figure 15:
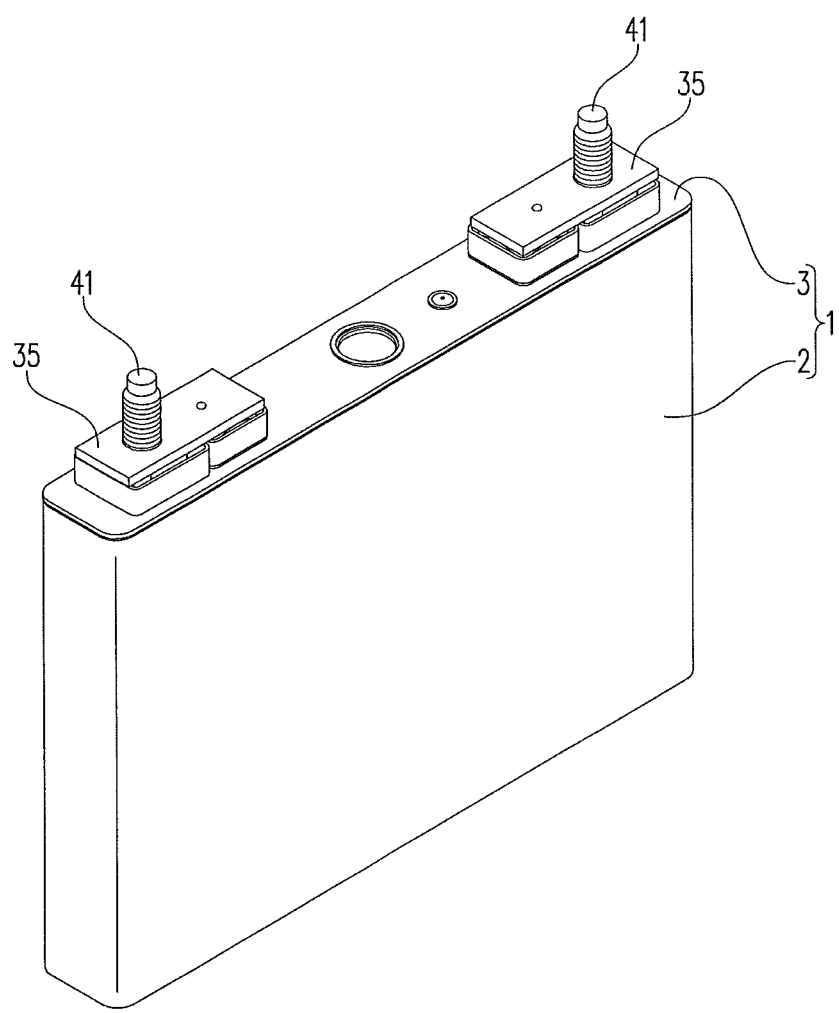
FIG. 15 is a perspective view showing an assembled battery according to another embodiment.
Figure 16:
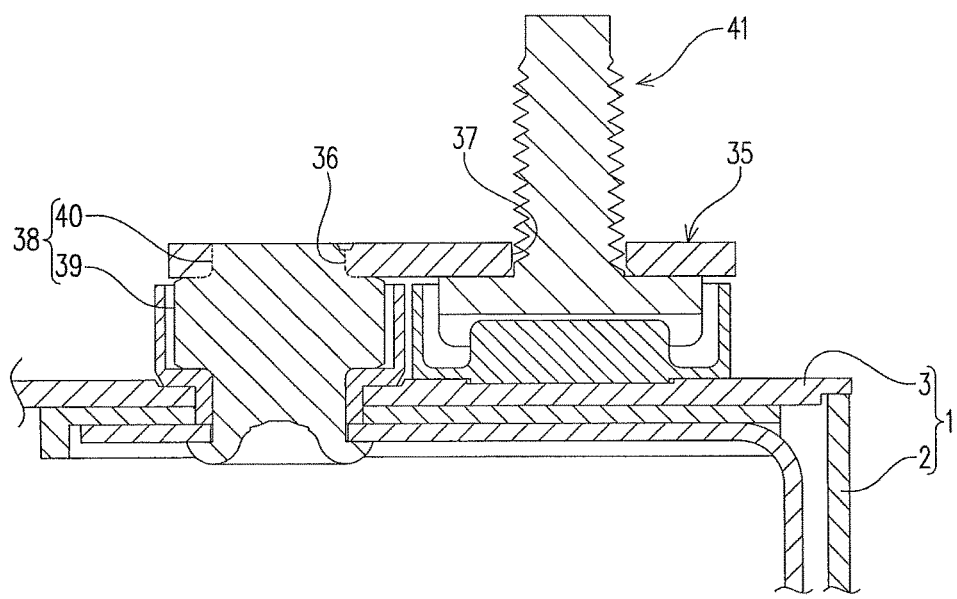
FIG. 16 is a detailed view showing the junction between a rivet member and an external terminal according to the aforementioned embodiment.

Further, in the aforementioned embodiment, an example in which the electric storage devices 2 are coupled by a connection method of welding is described. However, the connection method may be screw tightening. In that case, as shown in FIG. 15 and FIG. 16, the second conductive member of the present invention corresponds to a pulling member 35 having a first through hole 36 through which a projection 40 provided in a head 39 of a rivet member 38 can be inserted and a second through hole 37 through which a shaft of an external terminal 41 is inserted.

Further, the electrode assembly 4 is not limited to those wound into an elongated cylindrical shape, as in the aforementioned embodiment, and may have another shape. For example, the electrode assembly 4 may be of a stack type in which a plurality of positive electrode sheets 5 and a plurality of negative electrode sheets 6 are alternately stacked via separators 7.

Further, in the aforementioned embodiment, an example in which the case 3 is formed using aluminum alloy, steel, or the like is described. However, the material of the case 3 (the case body 3a and the cover plate 3b) may be arbitrarily selected. Accordingly, a material other than metals may be used for the case 3. For example, an insulating material may be used therefor. Further, the shape, structure, or the like of the case 3 (the case body 3a and the cover plate 3b) is also not limited to the aforementioned embodiment, and may be arbitrarily selected.

Further, in the aforementioned embodiment, an example in which the terminal structures 9 are provided in the cover plate 3b is described. However, the terminal structures 9 may be provided in the case body 3a.

Further, in the aforementioned embodiment, in order to insulate the external terminal 14 and the cover plate 3b from each other, members having insulating properties are used for both the outer gasket 11 and the resin plate 10. However, there is no limitation to this. For example, in the case where the partition wall of the case 3 and the electrode assembly 4 are electrically connected to each other via the conductive member 12, the outer gasket 11 or the resin plate 10 may have conductivity. Examples of the method for imparting conductivity to the outer gasket 11 or the resin plate 10 include a method of mixing a substance having conductivity such as carbon in a synthetic resin. Further, the configuration may be such that the conductive member 12 and the cover plate 3b are directly in contact with each other without providing the outer gasket 11, the resin plate 10, and the like.

Further, the aforementioned embodiment illustrates a configuration in which the head 13c of the rivet member 13 and the external terminal 14 are fixed to each other by friction stir welding, not only on the negative electrode side but also on the positive electrode side. However, the rivet member 13 and the external terminal 14 on the positive electrode side are formed using aluminum or aluminum alloy, and therefore they may be joined to each other by laser welding instead of friction stir welding. Further, the rivet member 13 and the external terminal 14 may be integrally formed, for example, by forging the rivet member 13 and the external terminal 14.

Further, a lithium ion secondary battery cell is described in the above embodiment. However, the type and size (capacity) of battery cell may be arbitrarily selected.

Further, the present invention is not limited to the lithium ion secondary battery cell. The present invention can be applied also to primary battery cells and capacitors such as electric double layer capacitors in addition to various secondary battery cells.

Further, the present invention is not applied only to the assembled battery 1 combining a plurality of lithium ion secondary battery cells. The present invention may be applied to an electric storage device assembly combining a plurality of electric storage devices. The electric storage device assembly includes at least two electric storage devices including at least one electric storage device of the present invention and a coupling member coupling the electric storage devices. That is, the electric storage device assembly may be obtained by combining the electric storage device of the present invention and another electric storage device other than the electric storage device of the present invention.

Further, in the aforementioned embodiment, the description was made for the rivet member 13 as the first conductive member. However, any member may be used as the first conductive member as long as it can be fixed to the cover plate 3b.

REFERENCE SIGNS LIST

1: Assembled Battery (Electric Storage Device Assembly)
2: Battery Cell (Electric Storage Device)
3: Case
3a: Case Body
3b: Cover Plate
3c: Through Hole
3d: Recess
4: Electrode Assembly
5: Positive Electrode Sheet
6: Negative Electrode Sheet
7: Separator
8: Current Collector
8a: Connection Part
8b: Through Hole
9: Terminal Structure
10: Resin Plate
10a: Recess
10b: Through Hole 11: Outer Gasket
11a: Outer Wall
11b: Recess
11c: Through Hole
11d: Annular Projection
12: Conductive Member
12a: Welding Groove
13: Rivet Member (First Conductive Member)
13a: Inserted Part
13b: Swaged Part
13c: Head
13d: Flat Surface
13g: Abutting Surface
14: External Terminal (Second Conductive Member)
14a: Conductor Connection Part
14b: Flat Surface
15: Coupling Member
16: Tool
17: Probe
18: Conductive Member
18a: Welding Groove
19: Rivet Member
19c: Head
19d: Flat Surface
19e: Projection
19f: Upper End Face
19g: Abutting Surface
20: External Terminal
20a: Conductor Connection Part
20b: Flat Surface
20c: Recess
20d: Abutting Surface
21: Conductive Member
21a: Welding Groove
22: External Terminal
22a: Conductor Connection Part
22c: Recess
22d: Abutting Surface
23: Conductive Member
23a: Welding Groove
24: Conductive Member
24a: Welding Groove
25: External Terminal
25a: Conductor Connection Part
25c: Recess
25d: Abutting Surface
25e: Flat Surface
26: Conductive Member
26a: Welding Groove
27: Rivet Member
27c: Head
27g: Abutting Surface
28: Conductive Member
28a: Welding Groove
29: Rivet Member
29c: Head
29d: Flat Surface
29g: Abutting Surface
30: External Terminal
30a: Conductor Connection Part
30b: Flat Surface
30c: Recess
30e: Hole
30d: Abutting Surface
31: Conductive Member
31a: Welding Groove
32: Conductive Member
32a: Welding Groove
33: Rivet Member
33a: Inserted Part
33c: Head
33d: Flat Surface
34: External Terminal
34c: Recess
34h: Through Hole
34i: Flat Surface
35: Pulling Member
36: First Through Hole
37: Second Through Hole
38: Rivet Member
39: Head
40: Projection
41: External Terminal
A: Joint Part
A1: Nugget Part

The invention claimed is:

1. An electric storage device comprising:
an electrode assembly including a positive electrode plate and a negative electrode plate insulated from each other;
a case comprising a partition wall and housing the electrode assembly;
a first conductive member passing through a hole in the partition wall and electrically connected to the electrode assembly inside the case; and
a second conductive member arranged outside the case and electrically connected to the first conductive member, wherein
the first conductive member comprises an inserted part inserted through the hole in the partition wall and a head bulging from the inserted part, the head being provided at an end of the first conductive member in an insertion direction of the inserted part, and
the second conductive member is formed using a metal material different from a material of the first conductive member and is fixed to the head of the first conductive member by a weld formed by friction stir welding, at least a part of the second conductive member, of the head of the first conductive member and the partition wall being arranged in this order in the insertion direction.

2. The electric storage device according to claim 1, wherein
the head of the first conductive member and the second conductive member respectively have flat surfaces, and
the flat surfaces are joined to each other by friction stir welding.

3. The electric storage device according to claim 1, wherein
the second conductive member has a recess configured to house at least a part of the head of the first conductive member, the recess being disposed on the side of the head of the first conductive member that is opposite the partition wall.

4. The electric storage device according to claim 3, wherein
abutting surfaces of at least a part of the head of the first conductive member and the recess of the second conductive member are joined to each other by friction stir welding.

5. The electric storage device according to claim 1, wherein
one of the head of the first conductive member and the second conductive member has a projection, the other of the head of the first conductive member and the second conductive member has a hole into which the projection is inserted or fitted, and abutting surfaces of the projection and the hole are joined to each other by friction stir welding.

6. The electric storage device according to claim 3, wherein the recess is formed through the second conductive member, and an upper surface of the head of the first conductive member and an upper surface of the second conductive member are flush with each other.

7. The electric storage device according to claim 5, wherein the projection is formed on the head of the first conductive member, the hole is formed through the second conductive member, and an upper surface of the projection of the first conductive member and an upper surface of the second conductive member are flush with each other.

8. An electric storage device comprising:

an electrode assembly including a positive electrode plate and a negative electrode plate insulated from each other;

a case comprising a partition wall and housing the electrode assembly;

a first conductive member passing through a hole in the partition wall and electrically connected to the electrode assembly inside the case; and a second conductive member arranged outside the case and electrically connected to the first conductive member, wherein the first conductive member comprises an inserted part inserted through the hole in the partition wall and a head bulging from the inserted part, the head being provided at an end of the first conductive member in an insertion direction of the inserted part, the first conductive member is formed using a first metal material, the second conductive member is formed using a second metal material that is different from the first conductive member, and the second conductive member is fixed to the head of the first conductive member via a nugget part in which the first metal material and the second metal material are mixed, at least a part of the nugget part being formed over the hole in the partition wall, and at least a part of the second conductive member, the head of the first conductive member and the partition wall being arranged in this order in the insertion direction.

9. An electric storage device assembly comprising:

at least two electric storage devices including at least one electric storage device according to claim 1; and a coupling member configured to couple the electric storage devices.

10. A method for producing the electric storage device according to claim 1, comprising:

fixing the second conductive member to the head of the first conductive member by friction stir welding; and fixing the first conductive member to which the second conductive member has been fixed to the partition wall of the case by inserting the first conductive member therethrough.

11. An electric storage device assembly comprising:

at least two electric storage devices including at least one electric storage device according to claim 8; and a coupling member configured to couple the electric storage devices.

12. A method for producing the electric storage device according to claim 8, comprising:

fixing the second conductive member to the head of the first conductive member by friction stir welding; and fixing the first conductive member to which the second conductive member has been fixed to the partition wall of the case by inserting the first conductive member therethrough.

13. The electric storage device according to claim 1, wherein at least a part of the weld is formed over the hole in the partition wall in the insertion direction of the inserted part.

14. The electric storage device according to claim 13, further comprising:

a current collector which electrically connects the electrode assembly to the first conductive member, wherein the inserted part of the first conductive member comprises a swaged part, the inserted part of the first conductive member is inserted through a hole in the current collector and the swaged part contacts the current collector.

15. The electric storage device according to claim 1, wherein the head of the first conductive member comprises a first flat surface formed on the side of the head of the first conductive member that is opposite the partition wall, and the weld is formed at the first flat surface.

16. The electric storage device according to claim 15, wherein the second conductive member comprises a second flat surface that contacts the first flat surface, the weld being formed at an interface between the first flat surface and the second flat surface.

17. The electric storage device according to claim 1, further comprising:

an outer gasket formed in the hole in the partition wall so as to separate the inserted part of the first conductive member from the partition wall.

18. The electric storage device according to claim 17, wherein the outer gasket is formed between the head of the first conductive member and the partition plate.

* * * * *